United States Patent [19]
Henschel

[11] Patent Number: 6,095,311
[45] Date of Patent: Aug. 1, 2000

[54] BRAKE FOR A FISHING REEL

[76] Inventor: Karl-Heinz Henschel, Breitackerstrasse 12/1, DE 72622 Nurtingen, Germany

[21] Appl. No.: 08/765,095
[22] PCT Filed: Oct. 18, 1995
[86] PCT No.: PCT/DE95/01454
 § 371 Date: Apr. 14, 1999
 § 102(e) Date: Apr. 14, 1999

[30] Foreign Application Priority Data

Oct. 21, 1994 [DE] Germany ............... 44 37 651

[51] Int. Cl.$^7$ .................................. A01K 89/033
[52] U.S. Cl. ............... 192/223.3; 242/264; 188/72.7; 188/83
[58] Field of Search ............... 192/223, 223.2, 192/223.3; 242/264, 265, 291, 302, 303; 188/72.7, 83, 134

[56] References Cited

U.S. PATENT DOCUMENTS

| | | | |
|---|---|---|---|
| 3,604,658 | 9/1971 | Nurmse et al. | 242/265 |
| 4,703,902 | 11/1987 | Prouza et al. | 188/72.7 X |
| 5,259,565 | 11/1993 | Hitomi | 188/83 X |
| 5,645,238 | 7/1997 | Saitta, Jr. | 242/264 |

FOREIGN PATENT DOCUMENTS

4437651 C1  10/1995  Germany.

*Primary Examiner*—Richard M. Lorence
*Attorney, Agent, or Firm*—Browdy and Neimark

[57] ABSTRACT

With known fishing reels of the anti-reverse type, i.e. reels wherein the crank stops when the line is pulled off, the braking force is the same when pulling the line off or when reeling it in. This property is disadvantageous when fighting a fish. The brake of the novel reel is intended to provide the effect of the braking force being greater when reeling in than when the line is pulled off. The object is attained in that a pressure element 8, which is fixed against relative rotation, is assigned to the disk 3 and is provided on its front face with inclined planes, in whose lowest point revolving bodies 9 are located, which are supported in the lowest points of the inclined plane of the crank 10, which is rotatable on the hollow shaft 5. Balls 11 are assigned to the opposite side of the crank 10, which are supported on the ring 12 fastened on the hollow shaft 5. The revolving bodies 9 generate an axial force on the inclined planes when the crank 10 is turned opposite the line being pulled off, which acts in addition to the set braking force.

2 Claims, 1 Drawing Sheet

BRAKE FOR A FISHING REEL

BACKGROUND OF THE INVENTION

1. Technical Field of the Invention

The invention relates to a brake for a fishing reel, in particular for fly fishing, wherein the crank can only be turned in one direction, and the brake preferably only works in the unwinding direction.

2. Prior Art

The device has the purpose of increasing the preset braking force when the line is reeled in. Up to now, with reels of the "anti-reverse" type, the brake acts with equal strength when pulling off the line and when reeling it in against the resistance of the fish. This has negative effects when drilling, i.e. fighting the fish, since a required change of the braking force can only take place by adjusting the brake adjustment nut.

To do this it is necessary to let go of the crank, which can mean the loss of the fish (DE 43 02 840 C1).

Fishing reels are known (U.S. Pat. No. 4,715,555), which attempt to remedy this disadvantage by bridging the brake, in that the crank is directly coupled with the reel by means of an interlocking detent device.

The possible blocking of the line, because the brake is no longer effective, is disadvantageous in connection with this embodiment. Because of this there is the danger that the line will break. Another disadvantage lies in the transition from the braking effect to blocking since, if there is a pull on the line, the device does not yet correctly block during this moment of switching, and the brake no longer works effectively. The hard shocks being created in the process can also lead to breaking of the line.

OBJECT AND SUMMARY OF THE INVENTION

It is therefore the object of the invention to improve a reel of the above mentioned type in such a way that the disadvantages of the known embodiment are prevented by the most simple means.

This object is attained in accordance with the invention in that a pressure element is associated with the axially movable, but fixed against relative rotation, disk of a disk brake, which is provided with tongues on one side which are located, axially displaceable, in the groove of the hollow shaft, and which is provided on the other side with several inclined planes on the front, on whose respectively lowest point revolving bodies, for example balls, are located, which in turn are supported on the inclined planes of a crank located rotatably on the hollow shaft, to which balls have been assigned on the opposite side, which are supported by a ring fastened on the hollow shaft.

By means of this attainment of the object a disk brake is made possible, which has an adjusted braking force when the line is pulled off by the fish and which, when actuating the crank against the pull of the line, provides an increased braking force on the brake disk by means of the the revolving bodies rolling off on the inclined planes and the additional pressure generated by this.

The increase of the braking force which can be metered without the danger of blocking is particularly advantageous.

In an advantageous embodiment of the described attainment of the object, an elastic ring is disposed between the pressure element and the hollow shaft, which cancels the additional axial force when the crank force is reduced. Then the brake only acts with the previously set force.

BRIEF DESCRIPTION OF THE DRAWINGS

A preferred embodiment of the invention represented in the attached drawings will be explained in what follows.

Shown are in.

Figure 1:
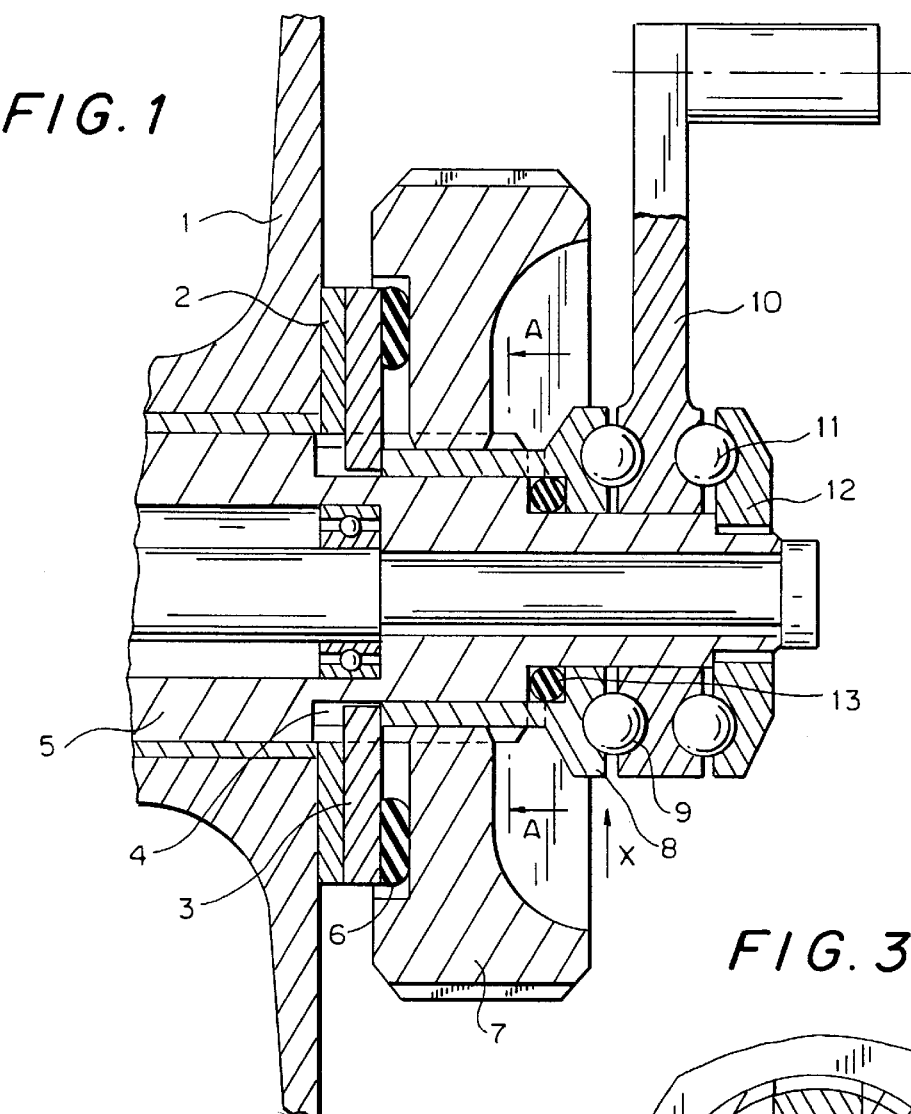
FIG. 1, a cross section through the brake.
Figure 3:
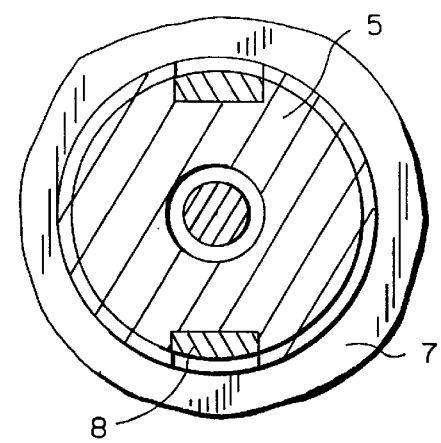
Figure 2:
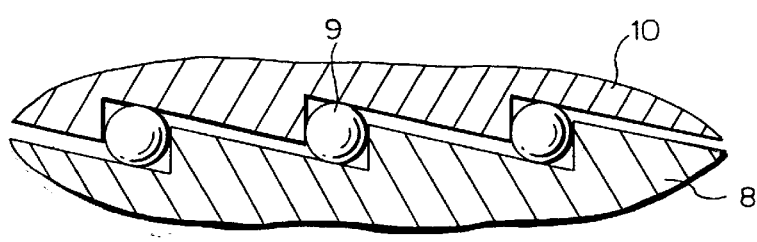
FIG. 2, the roll-off of the inclined planes of the pressure element 8 and the crank 9 with the revolving bodies, and FIG. 3, the section along the line A—A in FIG. 1.

The basic structure of fly reels is known per se. For this reason it will not be discussed here.

DETAILED DESCRIPTION OF THE PREFERRED EMBODIMENT(S) OF THE INVENTION

The brake of a fly reel, shown in detail in the drawings, acts on a reel 1, on which the line, not represented here, is received. The reel has friction surfaces 2 and an axially movable disk 3, whose protrusions engage the grooves 4 of the hollow shaft 5 and are fixed against relative rotation in this manner. In a known manner, the disk 3 is adjusted to the required braking force by an elastic member 6 with the brake adjustment nut 7.

In addition, a pressure element 8 has been assigned to the disk 3, which rests with its tongues, which are also located in the groove of the hollow shaft, against the protrusions of the disk 3.

The other side of the pressure element 8 is provided with inclined planes, at whose lowest point there are revolving bodies 9, which in turn are supported at the lowest points of the inclined planes of the crank 10, which can be rotated on the hollow shaft 5.

Balls 11 are associated with the other side of the crank 10 and rest against a ring 12 fastened on the hollow shaft 5.

An elastic ring 13 is disposed between the hollow shaft 5 and the pressure element 8.

What is claimed is:

1. A brake adapted for use on a fishing reel (1) having a crank (10), wherein the crank increases a braking force when turned in a wind-up direction over that of an adjusted braking force provided when the reel is unwinding; said brake comprising: a crank (10)

a disk (3) adapted to be engaged to a disk brake (2) of the reel;

a hollow shaft (5) adapted to be engaged to the reel;

the disk (3) being adjustable along a longitudinal axis of the hollow shaft and being fixed against relative rotation on the hollow shaft by protrusions engaged in grooves (4) on the hollow shaft;

a pressure element (8) having tongues slidably engaged in grooves (4) abutting against the protrusions of the disk;

the pressure element (8) having first inclined planes on a face opposite to a face on which said tongues are located;

the crank (10) having second inclined planes on a first face opposite to said first inclined planes;

first revolving bodies (a) each being respectively engaged at a low point of each of the first inclined planes and the second inclined planes; and second revolving bodies engaged in corresponding grooves on a second face of the crank and a ring fixed to the hollow shaft in the wind-up direction increases the pressure exerted on the pressure element to the disk.

2. The brake according to claim 1, wherein an elastic ring (13) is disposed between the hollow shaft (5) and the pressure element (8).

* * * * *